United States Patent [19]

Nakayama

[11] Patent Number: 5,581,725
[45] Date of Patent: Dec. 3, 1996

[54] CACHE MEMORY SYSTEM HAVING FIRST AND SECOND DIRECT-MAPPED CACHE MEMORIES ORGANIZED IN HIERARCHICAL STRUCTURE

[75] Inventor: Takashi Nakayama, Tokyo, Japan

[73] Assignee: NEC Corporation, Japan

[21] Appl. No.: 129,409

[22] Filed: Sep. 30, 1993

[30] Foreign Application Priority Data

Sep. 30, 1992 [JP] Japan .................................. 4-260980

[51] Int. Cl.⁶ .............................. G06F 12/08; G06F 13/00
[52] U.S. Cl. ...................... 395/449; 395/444; 364/243.4; 364/243.45; 364/DIG. 1; 364/DIG. 2
[58] Field of Search ..................................... 395/425, 400, 395/444, 445, 446, 447, 448, 449, 451; 364/200, 900, 243.44, 243.45, DIG. 1, DIG. 2, 243.4, 243.41

[56] References Cited

U.S. PATENT DOCUMENTS

| | | | |
|---|---|---|---|
| 5,325,503 | 6/1994 | Stevens et al. | 395/425 |
| 5,359,723 | 10/1994 | Mathews et al. | 395/425 |
| 5,369,753 | 11/1994 | Tipley | 395/425 |
| 5,386,547 | 7/1995 | Jouppi | 395/425 |

OTHER PUBLICATIONS

Jouppi, Norman P. "Improving Direct-Mapped Cache Performance by the Addition of a Small Fully-Associative Cache and Prefect Buffers", 1990 IEEE International Sumposium on Computer Architecture.

Hennessy, John L. and Patterson, David A., "Computer Architecture: A Quantitative Approach", pp. 408–425. Morgan Kaufman Publishers, Inc. 1990.

*Primary Examiner*—Tod R. Swann
*Assistant Examiner*—Tuan V. Thai
*Attorney, Agent, or Firm*—Whitham, Curtis, Whitham & McGinn

[57] ABSTRACT

A microprocessor includes a CPU, a main memory and primary and second cache memories of the direct mapped type, that are all implemented on the same LSI chip. The second cache memory's capacity is not greater than the primary cache memory. The primary and second cache memories are organized in a hierarchical structure so that the primary cache memory is accessed before the secondary cache memory, and when the first cache memory is not hit, the secondary cache memory is accessed. Thus, a high performance microprocessor having a small chip area is constructed by adding a small, high speed secondary cache memory, rather than by increasing the memory capacity of the primary cache memory.

8 Claims, 7 Drawing Sheets

CACHE MEMORY SYSTEM HAVING FIRST AND SECOND DIRECT-MAPPED CACHE MEMORIES ORGANIZED IN HIERARCHICAL STRUCTURE

BACKGROUND OF THE INVENTION

1. Field of the Invention

The present invention relates to a cache memory system, and more specifically to a cache memory system including a plurality of direct-mapped cache memories organized in a hierarchical structure.

2. Description of Related Art

Under a recent advancement circumstance of semiconductor devices, a clock frequency of microprocessors is increasing more and more, but an access time for a DRAM (random access memory) and a ROM (read only memory), which constitute a main memory, is not so shortened. To compensate this Speed gap, it has been frequently adopted to provide between a processor and the main memory a cache memory which is composed of a high speed memory of a small memory capacity.

For example, a fundamental architecture of the cache memory is described in detail in "Computer Architecture: A Quantitative Approach" John L. Hennessy & David A. Patterson, Morgan Kaufman Publishers Inc., 1990.

In brief, the main memory is previously divided into a number of blocks each having the same capacity ordinarily on the order of 16 bytes, and some of the blocks is stored in the cache memory. The block in the cache memory is called an "entry". Each of the entries of the cache memory is composed of three sections: (1) a dam memory section for storing data, (2) a tag memory section for storing information (called a "tag") about at which address the data stored in the data memory section is located within an address space, and (3) a status flag indicating whether or not a valid data is stored in the entry. This status flag may have a different meaning in a different system.

The structure of the cache memory can divided into a direct mapped type, a set associative type, and a fully associative type.

① Direct mapped:

Each entry includes one set of a tag section, a status flag and a data section which are formed of a RAM, respectively. The RAM (tag section and data section) is accessed by using least significant bits (index) of a given address, as an address information. It an output of the tag section is equal to most significant bits (tag) of the given address, and if the status flag indicates "valid", the data of the data section of the entry concerned is valid, namely, is hit.

② Set associative:

Them are provided N sets of direct-mapped RAMs (ordinarily, two sets or four sets), which are accessed in parallel to each other. If any one of the sets is hit, the output of the data section of the hit set is selected.

③ Fully associative:

The tag section of each entry has a comparator for directly comparing the given address and the content of the tag section. Ordinarily, it is constituted of a CAM (content addressable RAM).

The hit rate (hit number/access number) of the above mentioned three types is highest in the fully associative type ③, and drops in the order of the set associate type ② and the direct mapped type ①. However, the access time of the cache memory is longest in the fully associative type ③, and becomes short in the order of the set associate type ② and the direct mapped.type ①. In addition, when the cache memory is implemented on a LSI (large scaled integrated circuit) chip, the required area becomes large in the order of ①<②<③. In particular, the fully associative type is disadvantageous in that the required area is large and the necessary processing is complicated at the time of the missed hit.

In a recent CPU of the RISC (reduced instruction set computer) type, since the clock frequency is directly influenced by the access time of the cache memory, the direct mapped type has been adopted in many cases.

Here, referring to FIG. 8, there is shown a graph of a miss rate ("1" minus "hit rate") in the direct mapped type ① and the Set associate type ②. This graph was based on the data shown in FIG. 8.12 of "Computer Architecture: A Quantitative Approach" quoted hereinbefore.

In the direct mapped type ① and the set associate type ②, since different addresses are forced to use the same entry, a missing (conflict missing) occurs, and therefore, the miss rate is higher than the fully associate type ③.

In addition, it would be seen from FIG. 8 that the larger the memory capacity of the cache memory becomes, the lower the cost/performance becomes. When the cache memory capacity is doubled, the miss rate is lowered by a constant rate (0.7 to 0.8 times), but when the cache memory is implemented in the LSI, the required area is in proportion to the memory capacity.

Therefore, in order to realize the cache memory and the CPU on a single chip LSI, a cache memory system having a preferable area saving property and a low miss rate is desired.

Here, another conventional architecture of the cache memory system is discussed. A high efficient cache memory system having a direct mapped cache memory (which is high in the access speed, but low in the hit rate) added with a small size of cache memory of the fully associative type (which is low in the access speed, but high in me hit rate), is disclosed in "Improvement Direct-Mapped Cache Performance by the addition of a Small Fully-associative Cache and Prefetch Buffers", Norman P. Jouppi, 1990 IEEE International Symposium on Computer Architecture.

In this cache memory system, when the direct-mapped cache memory (primary cache) is missed, the fully-associative cache (called a "victim cache" in the above quoted paper) is accessed as a secondary cache. Then, if the secondary cache is missed, the main memory is accessed. Since both of the caches are implemented together with the CPU on the same LSI chip, a transfer between the primary cache and the secondary cache is performed at a high speed (one clock cycle). Since most of the memory accesses which had mishit in the direct-mapped cache memory due to the conflict miss hits in the secondary cache, the miss rate reducing effect obtained by doubling the memory capacity of the primary cache can be obtained by the secondary cache of four to eight entries.

This cache memory is disadvantageous in that the secondary cache is of the fully-associative type. Since the fully-associative cache memory has a comparator provided for each of he entries, the required chip area is remarkably increased. In addition, a control logic for determining which of the entries should be replaced when the memory access is not hit, is very complicated (ordinarily, LRU (least recent used)), and the testing is difficult. On the other hand, the defect that the access speed is low is not a problem, since the secondary cache is accessed only when the primary cache is not hit.

As mentioned above, the direct-mapped cache is high in the access speed and small in the required chip area, but low in the hit rate. The set-associative cache is inferior to the direct-mapped cache in the access speed and in the area efficiency, and inferior to the fully-associative cache in the hit rate. The fully-associative cache has the highest hit rate, but the lowest access speed and remarkably large in the required chip area. In addition, the required control logic is complicated, and the testing is difficult.

Furthermore, the victim cache is excellent in that the high hit rate of the fully-associative type can be enjoyed while maintaining the high speed operation of the direct-mapped type. However, this still has the disadvantage of the fully-associative type, namely, the large required chip area and associated complications. Therefore, a further improvement is needed.

SUMMARY OF THE INVENTION

Accordingly, it is an object of the present invention to provide a cache memory system which has overcome the above mentioned defect of the conventional one.

Another object of the present invention is to provide a cache memory system which requires only a small chip area when the cache memory and the CPU are implemented together in the same LSI chip, and which has a high performance.

A further object of the present invention is to provide a microprocessor having a cache memory system which is high in the access speed and has a high hit rate and which is easy to control, by using a primary cache of the direct mapped type and a small size of secondary cache of the direct mapped type.

The above and other objects of the present invention am achieved in accordance with the present invention by a cache memory system comprising:

a first cache memory and a second cache memory, each of the cache memories including a data memory section for storing data, a tag memory section for storing an address tag for data stored in the data memory section, a comparator for comparing an output of rho tag memory section with the address tag of a given address, and a hit generator for generating a hit signal on the basis of an output of the comparator, and means for controlling the first cache memory and the second cache memory in such a manner that, in response to an access from an external, the first cache memory is accessed in the first place, and if the hit signal is not generated in the first cache memory, the second cache memory is accessed, and if the hit signal is not generated in the second cache memory, an external memory is accessed.

In one embodiment, the cache memory system further includes an exclusive-OR means receiving a portion of the given address when the first cache memory is not hit, so as to supply the result of the exclusive-OR as an address for the tag memory section and the data memory section of the second cache memory. In addition, the second cache memory Ires a memory capacity smaller than that of the first cache memory. Furthermore, a transfer between the first cache memory and the second cache memory is performed in each clock cycle under control of a central processing unit.

The above and other objects, features and advantages of the present invention will be apparent from the following description of preferred embodiments of the invention with reference to the accompanying drawings.

DESCRIPTION OF THE EMBODIMENTS

Figure 1:
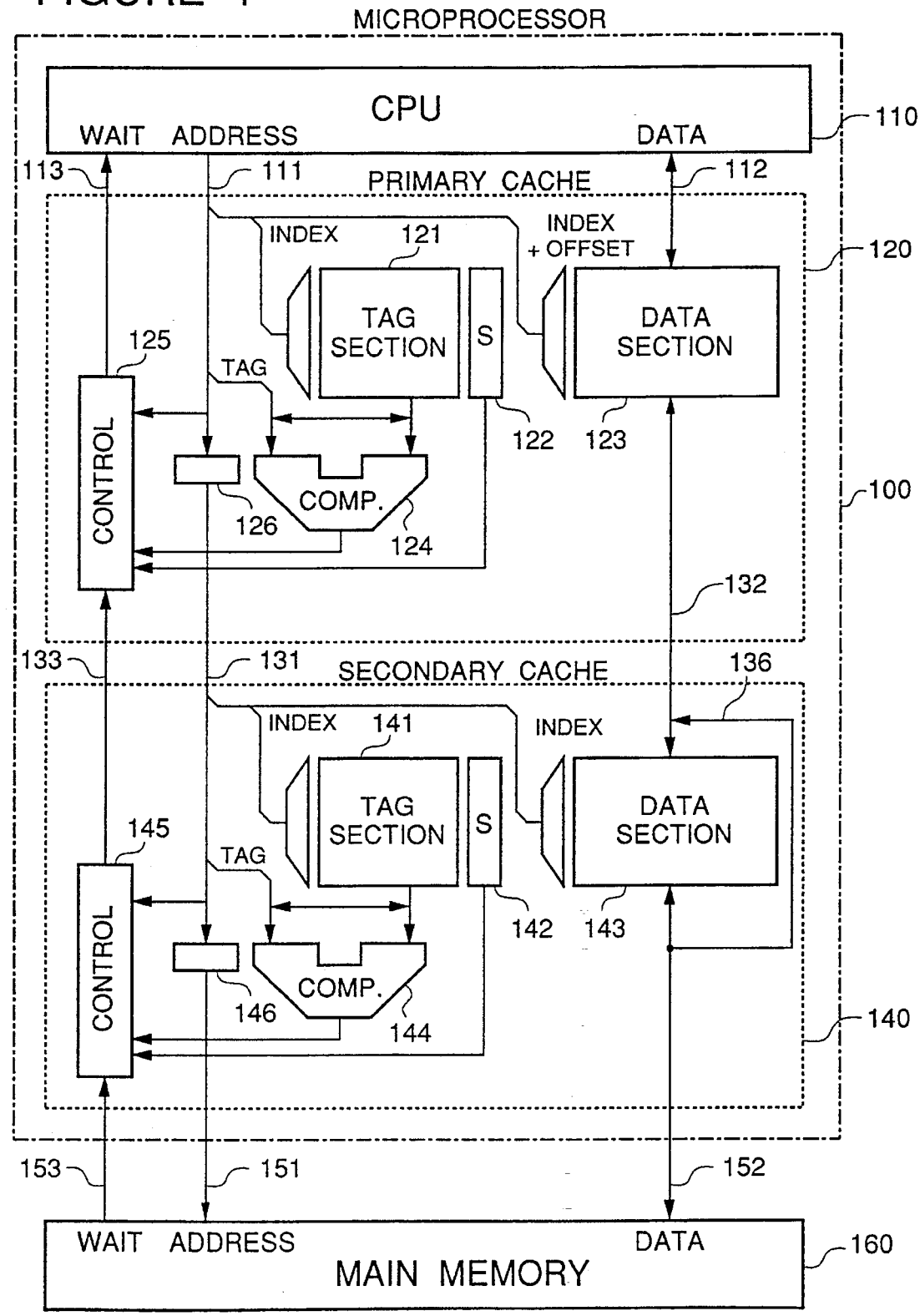
FIG. 1 is a block diagram of a first embodiment of the microcomputer including the cache memory system in accordance with the present invention.

Referring to FIG. 1, there is shown a block diagram of a first embodiment of the microcomputer: including the cache memory system in accordance with the present invention.

In the shown embodiment, a microprocessor generally designated by Reference Numeral 100 includes a CPU (central processing unit) 110, a primary cache memory 120, a secondary cache memory 140. The CPU 110, the primary cache memory 120 and the secondary cache memory 140 are integrated on the same single LSI chip, so as to constitute a microprocessor system, which is coupled to a main memory 160.

The microprocessor 100 also includes an address bus 111 connected between the CPU 110 and the cache memory 120, and the CPU 110 outputs through the address bus 111 a memory address in units of byte and the size of data to be accessed. A data bus 112 is coupled between the CPU 110 and the cache memory 120 so that data is outputted from the CPU to the cache memory and vice verse. A bus wait signal 113 is outputted from the primary cache memory 120 to the CPU 110.

Another address bus 131 is coupled from the primary cache memory 120 to the secondary cache memory 140 so that an address is supplied from the primary cache memory 120 to the secondary cache memory 140. A data bus 132 is coupled between the primary cache memory 120 and the secondary cache memory 140, and a bus wait signal 113 is outputted from the secondary cache memory 140 to the primary cache memory 120.

An address bus 151 is coupled between the secondary cache memory 140 and the main memory 160, and a data bus 152 is connected between the secondary cache memory 140 and the main memory 160. A bus wait signal 153 is outputted from the main memory 160 to the secondary cache memory 140.

Each of the cache memories 120 and 140 includes a tag memory 121 or 141 of $2^i$ words ×t bits for storing most significant bits (tag) of the associated address bus 111 or 131 by using least significant bits (index) of the associated address bus 111 or 131 as an address information. To this tag memory 121 or 141, there is associated a status flag memory 122 or 142 of $2^i$ words×2 bits receiving least significant bits (index) of the associated address bus 111 or 131 as an address information and indicating whether or not a corresponding entry is valid.

Each of the cache memories 120 and 140 also includes a data memory 123 or 143 of $2^{(1+b-2)}$ words×32 bits for reading and writing a value on the data bus 112 and 132 or on the data bus 132 and 152 by receiving least significant bits (index and offset) of the associated address bus 111 or 131 as an address information. In each of the cache memories 120 and 140, there is provided a comparator 124 or 144 receiving the most significant bits (tag) of the associated address bus 111 or 131 and an output of the corresponding tag memory 121 or 141 for the purpose of detecting whether or not both are consistent. Furthermore, there is provided a control circuit 125 or 145 receiving an output of the corresponding comparator 124 or 144, an output of the corresponding status flag memory 122 or 142 and the corresponding address bus 111 or 131 and for controlling the corresponding cache memory 120 or 140. Furthermore, the cache memories 120 and 140 includes an address buffer 126 or 146 coupled to the corresponding address bus 111 or 131 for supplying the memory address to the address bus 131 or 151 when the corresponding cache memory is mishitted.

Figure 2:
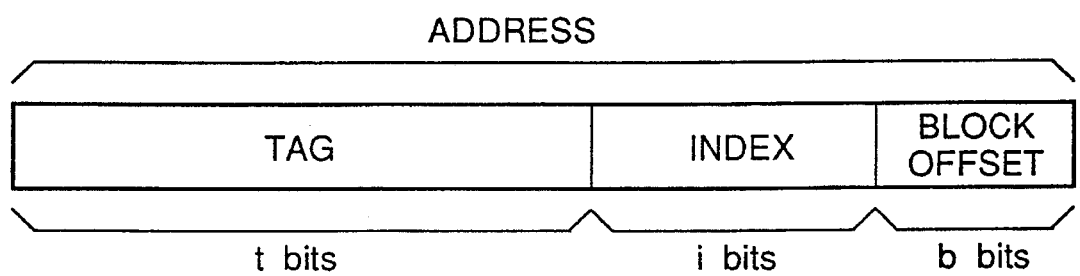
FIG. 2 illustrates an address structure of the direct-mapped type.

Referring to FIG. 2, there is illustrated how the address value on the address buses 111 and 131 are used in the cache memories 120 and 140. Assuming that a block size is $2^b$ bytes, an in-block offset (offset in block) has a width of "b" bits. In, addition, assuming that the number of entries of the cache is $2^i$, the index has a width of "i" bits, and the tag has the width obtained by subtracting the index width and the offset width from the bit width of the address.

For example, assuming that the address bus is 32 bits, the primary cache has the memory capacity of 8 Kbytes, and the block size is 16 bytes, the in-block offset is 4 bits ($2^{4=16}$) and the number of entries is 512 (=8K/16). Furthermore, the index is 9 bits ($2^9$=512); and the tag is 19 bits (=32–9–4). The block size "b" is the same in the primary cache memory 120 and the secondary cache memory 140.

Figure 3:
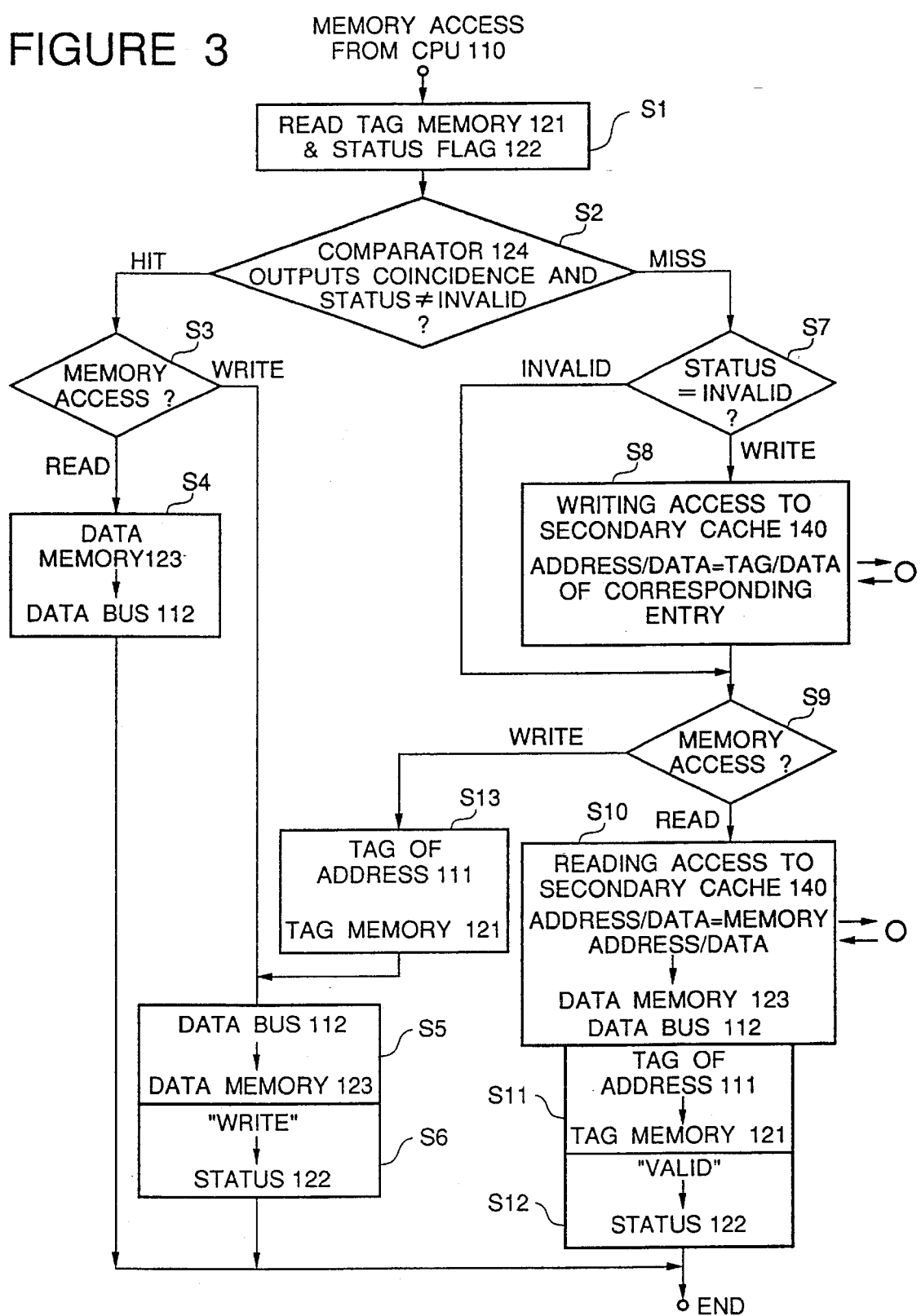
FIG. 3 is a flow chart illustrating the operation of the primary cache memory shown in FIG. 1.

Now, operation of the cache memory shown in FIG. 1 is will be described with reference to FIG. 3, which illustrates the operation of the primary cache memory 120 controlled by the control circuit 125. Assume that the content of the status flag memory 122 is initialized into an invalid condition.

If a memory access is generated by the CPU 110, in Step S1, the tag memory 121 and the status flag memory 122 are read out by using the index of the address on the address bus 111 as the address information, and in Step S2, the value read out from the tag memory 121 is compared with the tag of the address 111 by the comparator 124. If the result of the comparison indicates coincidence and the status flag 122 shows "valid" or "write", the control circuit 125 judges that the cache memory 120 is hit. In the other cases, the control circuit 125 judges that the cache memory 120 is missed hit.

In the case of the hitting in Step S2, the content of the data memory 123 is read or written through the data bus 112 by using the index and the in-block offset of the address 111 as the address information (Steps S4 and S5). If the access from the CPU 110 is the writing, the content of the data memory 123 is rewritten only in a portion of the size designated by the designated address in the entry (byte width, word width, etc.), and then, "write" is written to the status flag memory (Steps S5 and S6).

In the case of the missing in Step 2, whether the status flag 122 is "write" or "invalid" is discriminated (Step S7). If the status flag 122 shows the "write", the entry designated by the index is written to an external, namely to the secondary cache memory 140 in this case (Step S8). Then, the address read out from the tag memory 122 is used as the address, and the content of the data memory 123 is written as the data. The access to the external is the amount corresponding to one entry, and if the block size is larger than the bus width, a plurality of bus cycles are required.

If the access from the CPU 110 is the reading, the entry designated by the address 111 is read from an external, and for the read entry, only a portion of the content of the data memory 123 corresponding to the size designated by the address 111 is transferred through the data bus 112 to the CPU 110 (Step S10). At the same time, the tag of the address 111 is written to the tag memory 121, and the "valid" is written to the status flag 122 (Steps S11 and S12).

If the access from the CPU 110 is the writing, the tag of the address 111 is writer into the tag memory (Step S13). At the same time, the content of the data memory 123 is rewritten only in a portion of the size designated by the designated address in the entry (byte width, word width, etc.), and then, "write" is written to the status flag memory (Steps S5 and S6).

The control circuit 125 outputs the bus wait signal 113 to the CPU. 110 so as to put the CPU 110 in a wait condition Until a processing in the case of a missed hit in the primary cache memory 120 is completed. Similarly, it is in some eases that access to the secondary cache memory 140 (S8 and S10) is waited by the bus wait signal 133.

Operation of the secondary cache memory 140 controlled by control circuit 145 is similar to the primary cache memory 120. Since it would be understood by replacing the relation of the CPU/primary cache/secondary cache with the relation of the primary cache/secondary cache/main memory, explanation of the operation of the secondary cache memory 140 will be omitted.

A method itself for controlling each single cache memory is known to average persons skilled in the art. The control method for the cache memories disclosed herein is a so-called write back system (which can also called a "copy back" or a "store in"). The status flag memories 122 and 142 have thee conditions ("invalid", "valid" and "write"). The write access from a high level is not transferred directly to a low level cache memory.

There is a system in which when a write access from a high level is generated, a low level memory is directly written (called a "write-through"). In this case, the state flags 122 and 142 have only two conditions ("invalid" and "valid"). Therefore, the control is relatively simple. However, the write-through system is higher in the miss rate than the write back system. To comply with a multiprocessor, there is the write back system having an increased number of the conditions of the status flags.

The significant feature of the cache memory system in accordance with the present invention is not the control method for each cache memory, but lies upon the hierarchical structure of the primary and secondary cache memories, and upon the fact that the primary and secondary cache memories can be accessed with a similar access time, and upon the fact that the he data can be quickly transferred between the primary and secondary cache memories. Therefore, even if various control methods for a single cache memory are used in any combination for the cache memories 120 and 140, it does not go out of the spirit of the present invention.

Figure 4:
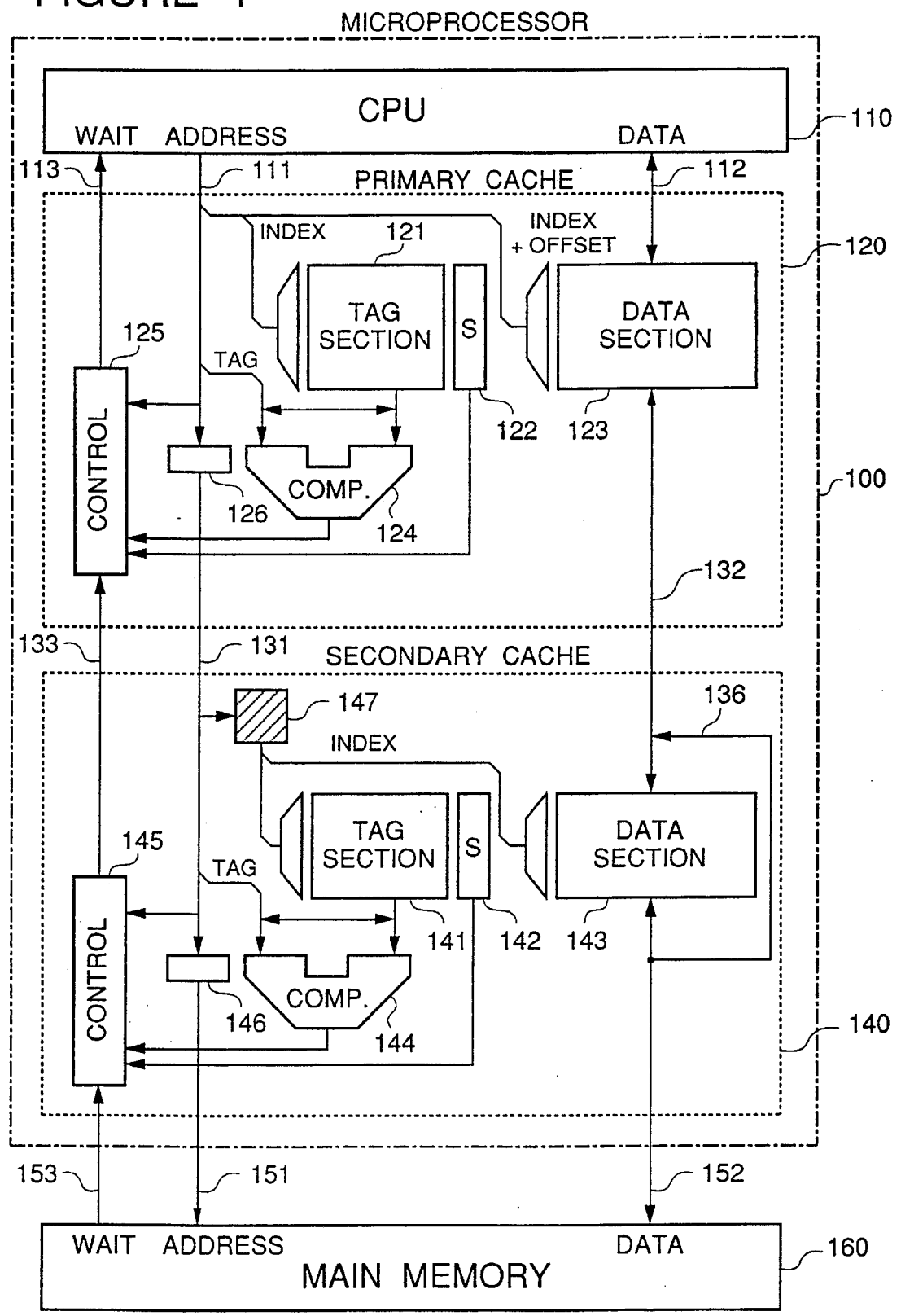
FIG. 4 is a block diagram of a second embodiment of the microcomputer including the cache memory system in accordance with the present invention.

Referring to FIG. 4, there is shown a block diagram of a second embodiment of the microcomputer including the cache memory system in accordance with the present invention.

The second embodiment is the same as the first embodiment, excluding two points. Therefore, in FIG. 4, elements similar or corresponding to those shown in FIG. 1 are given the same Reference Numerals, and explanation thereof will be omitted. One of the two different points is that the secondary cache memory 140 has an index generating circuit 147 for generating an index of the address for the memories 141, 142 and 143. The other different point is that the width ("t" bits) of the tag memory is larger than the first embodiment.

Figure 5:
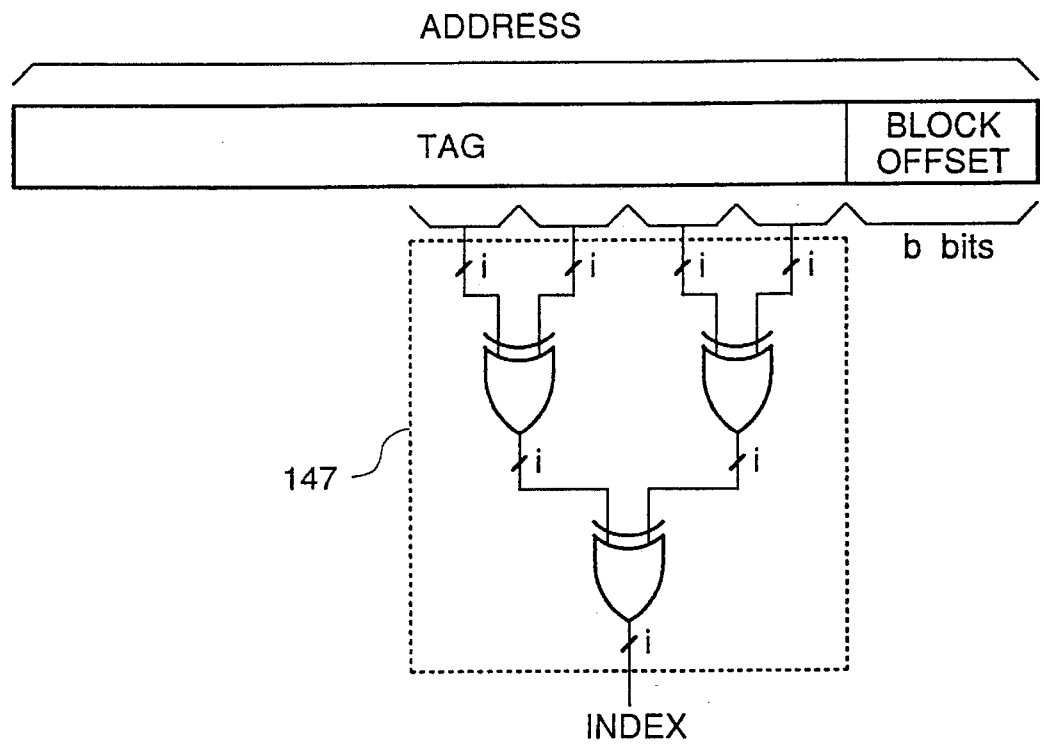
FIG. 5 illustrates an address structure of the direct-mapped type in the second embodiment.
Figure 6:
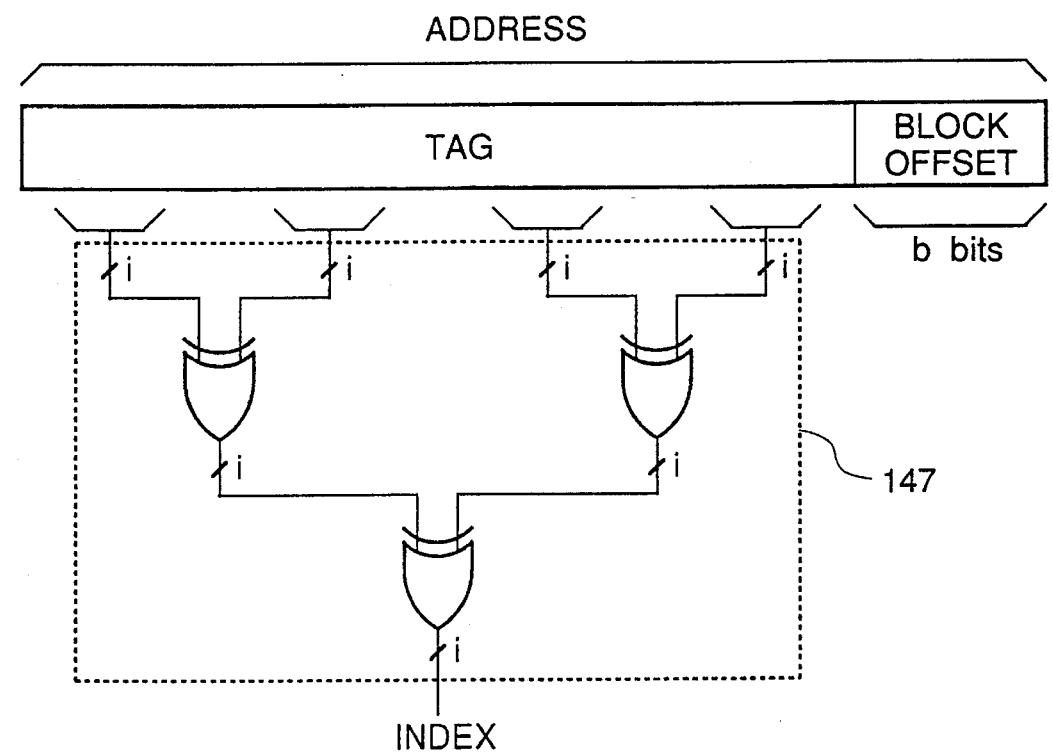
FIG. 6 illustrates an address structure of the direct-mapped type in the second embodiment.

FIGS. 5 and 6 illustrate how the address value of the address bus 131 is used in the cache memory 140. Differently from the example shown in FIG. 2, a portion obtained by subtracting the in-block offset from the address becomes the tag. The index is obtained by hashing a portion of the tag by the index generating circuit 147. The hashing function is realized by a combination of exclusive-OR gates connected in a hierarchical structure as shown in FIGS. 5 and 6.

The portion to be hashed of the address is preferred to include the index and a portion of the tag (at bit positions of the address) of the primary cache memory. Because the conflict miss is overcome, and therefore, the miss rate is reduced.

FIG. 5 shows an example in which the bits to be hashed start from the least significant bit of the tag. However, the bits to be hashed can be all bits of the tag, as shown in FIG. 6. The index generating circuit 147 shown in FIGS. 5 and 6 has a tree structure of two stages of exclusive-OR gates, but can be formed of a single stage of exclusive-OR gate, or a tree structure of three or more stages of exclusive-OR gates.

Because of file index generating circuit 147, the access time of the secondary cache memory 140 becomes long. However, it is possible to prevent the elongation of the access time by causing the index generating circuit 147 to operate in parallel to the access of the CPU 110 to the primary cache memory 120.

Here, the performance and the hardware cost of the cache memory systems in accordance with the present invention and the conventional example will be calculated.

Assuming that the performance when the memory can be accessed at every clocks with no wait is "1", the relative performance of the CPU can be expressed as Relative performance={1/mean access time}. Here, assume that the memory access is generated from the CPU at each of clocks. Here, the following definition is given M1 miss rate of the primary cache memory M2 miss rate of the secondary cache memory B1 access time of the primary cache memory (clock)

B2 access time of the secondary cache memory (clock)

B3 access time of the main memory (clock)

"b" block size (byte)

"a" bus width (byte)

In the case that the cache memory is only one stage (prior art)

$$\text{Relative performance} = 1/\{(1-M1) \times B1 + (M1 \times b/a \times B3)\} \quad (1)$$

In the case that the cache memory is two stages (victim cache or the present invention)

$$\text{Relative performance} = 1/\{(1-M1) + \\ (M1 \times (1-M2) \times b/a \times B2) + \\ (M1 \times -2 \times b/a \times B3)\} \quad (2)$$

Here, as one example, it is assumed that

B1=1 clock, B2=1 clock, B3=8 clocks,

"b" =16 bytes and "a" =4 bytes In some application (dam of diff: 16 KB), the memory capacity and the miss rate of the direct-mapped cache memory were measured. The result is shown in the following TABLE 1. The relative performance was obtained from the above equation (1).

TABLE 1

| Example | capacity | miss rate | relative performance |
|---|---|---|---|
| Example 1 | 8 Kbytes | 2.12% | 0.570 |
| Example 2 | 16 Kbytes | 1.19% | 0.644 |

In the same application, the measurement was performed for the victim cache system, the first and second embodiments of the present invention, and the result is shown in the table 2. The relative performance was obtained from the above equation (2). In addition, all of the primary cache memories are of the direct-mapped type of 8 Kbytes (the same as Example 1 in the table 1).

Example 3 shows one example of the victim cache system. Examples 4 and 5 are examples of the tint embodiment of the present invention, and Examples 6 and 7 are examples of the second embodiment of the present invention.

TABLE 2

| Example | type | capacity | miss rate | relative performance |
|---|---|---|---|---|
| 3 | fully associative | 4 entries | 60.7% | 0.634 |
| 4 | direct mapped | 8 entries | 91.0% | 0.560. |
| 5 | direct mapped | 128 entries | 85.9% | 0.574 |
| 6 | hashed direct mapped | 8 entries | 60.0% | 0.635 |
| 7 | hashed direct mapped | 128 entries | 27.3% | 0.757 |

Figure 7:
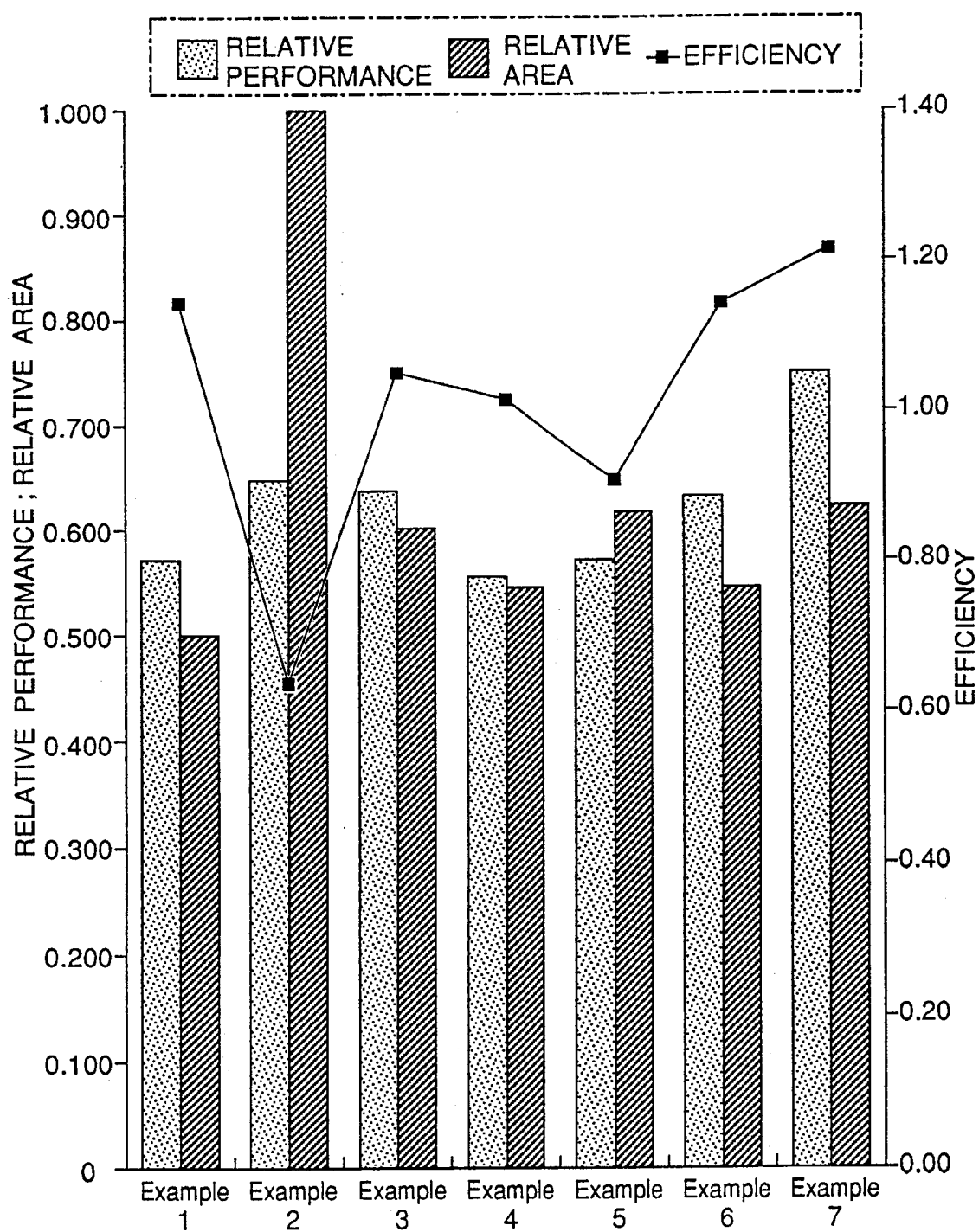
FIG. 7 is a graph illustrating the advantage of the present invention.
Figure 8:
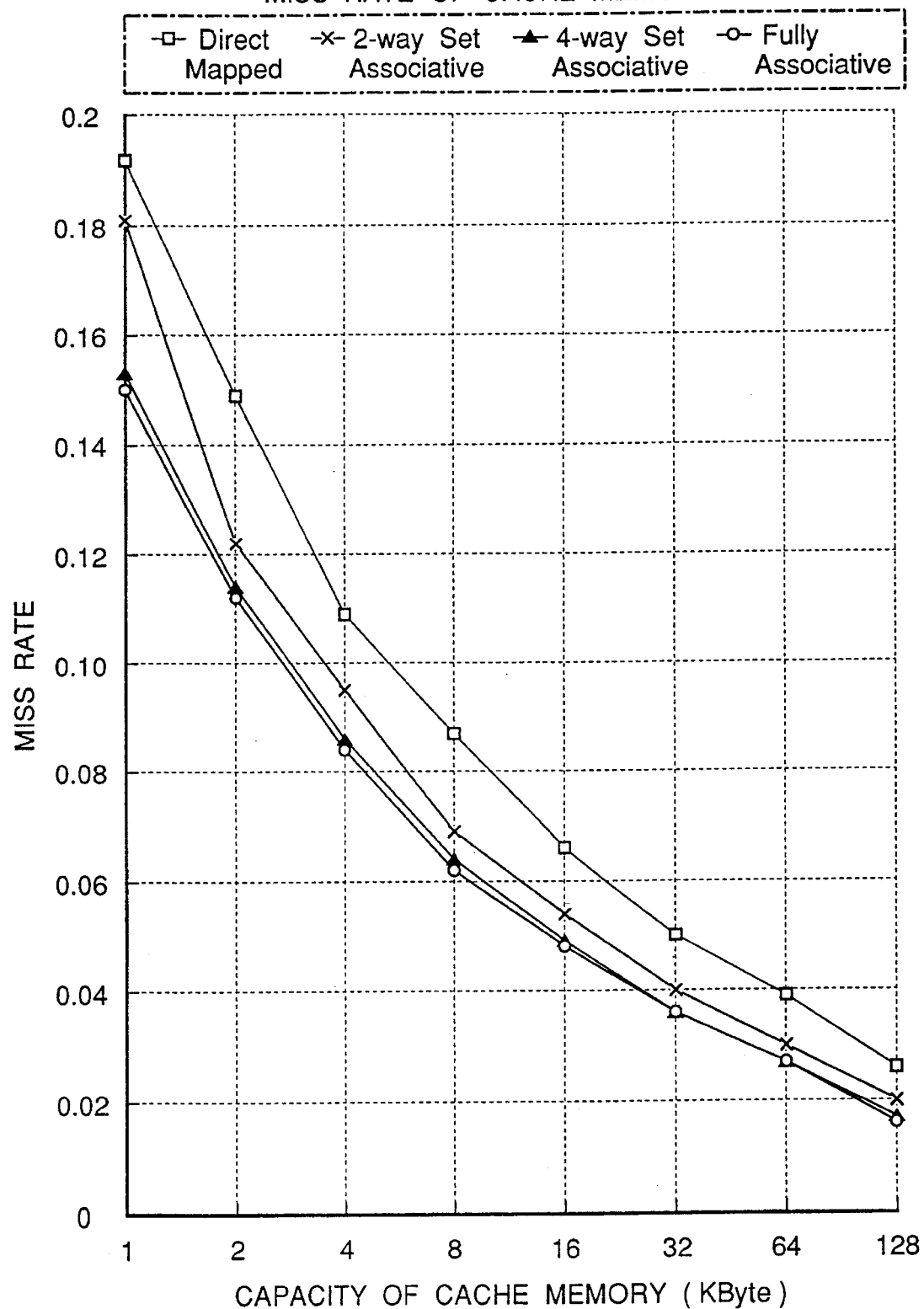
FIG. 8 is a graph illustrating the miss rate in the conventional cache memory types.

The performance of the above mentioned Examples 1 to 7 are shown in FIG. 7. In FIG. 7, the relative required area when each of Examples 1 to 7 is implemented in an LSI chip (assuming that the case of Example 2 is "1") and the efficiency (relative performance/relative area) are shown.

From FIG. 7, the following would be understood:

(1) Performance is high.

It would be understood from FIG. 7 that the present invention is short in the mean access time and high in performance. Example 7 (second embodiment) has a performance higher than that of the Example 2 in which the capacity of the primary cache memory is doubled in comparison with Example 1.

(2) Hardware efficiency is excellent.

FIG. 7 shows that the necessary hardware amount (the required chip area when the cache memory system is implemented on the LSI chip) of the embodiments of the present invention is smaller than that required in Example 2 (the capacity of the primary cache memory is doubled). In addition, Example 6 (second embodiment) has the performance comparable to that of Example 3 (victim cache) with the chip area smaller than that of Example 3. Example 3 is very low in the area efficiency. (relative performance/relative area), since it adopts the fully associative type. On the other hand, Example 7 has the performance higher than Example 2 (the primary cache memory of 16 Kbytes) by adding only the secondary cache memory of 2 Kbytes to the primary cache memory of 8 Kbytes.

(3) Hardware is simple.

As mentioned hereinbefore, the fully associative type used in the secondary cache memory of the victim cache is disadvantageous in that the control logic is complicated. The control logic (ordinarily, LRU: least recent used) for determining which of the entries should be exchanged in the case of a missed hit, is complicated. In addition, ordinarily, the data memory is accessed through the comparator, but at the time of exchanging the data, the random access must be possible. Accordingly, the testing is difficult.

However, the secondary cache memory used in the present invention is of the direct mapped type. Therefore, the hardware can be simply composed of an SRAM+one comparator. In addition, the primary cache memory and the secondary cache memory are of the same type, it is easy to design the control circuit.

The invention has thus been shown and described with reference to the specific embodiments. However, it should be noted that the present invention is in no way limited to the details of the illustrated structures but changes and modifications may be made within the scope of the appended claims.

I claim:

1. A cache memory system comprising:

a first cache memory and a second cache memory, said first and second cache memories comprising direct mapped cache memories, wherein said second cache memory has a memory capacity smaller than that of said first cache memory, each of said first and second cache memories including a data memory section for storing data, a tag memory section for storing an address tag for locating data stored in said data memory section, a comparator for comparing an output of said tag memory section with an address tag of a given address, and a hit generator for generating a hit signal when said comparator determines said output of said tag memory section coincides with said given address; and means for controlling said first cache memory and said second cache memory such that, in response to a reading access from an external device, said first cache memory is accessed first, and if the hit signal is not generated from said reading access of said first cache memory, said second cache memory is accessed, and if the hit signal is not generated from said reading access of said second cache memory, an external memory is accessed, wherein the smaller second cache memory and the larger first cache memory maintains or improves the hit/miss ratio of the overall cache memory system.

2. A cache memory system claimed in claim 1 further including an exclusive-OR means for receiving a portion of said given address when said access of said first cache memory does not generate said hit signal, so as to supply the result of said exclusive-OR as an address for said tag memory section and said data memory section of said second cache memory.

3. A cache memory system claimed in claim 1 wherein a transfer between said first cache memory and said second cache memory is performed during each clock cycle of a plurality of clock cycles under control of a central processing unit.

4. A cache memory system claimed in claim 1, wherein an access time for said first cache memory is substantially the same as an access time for said second cache memory.

5. A microprocessor comprising:

a central processing unit, a first cache memory and a second cache memory all implemented on a single integrated circuit chip, each of said first and second cache memories comprising direct mapped cache memories, wherein said second cache memory has a memory capacity smaller than that of said first cache memory and including a data memory section for storing data, a tag memory section for storing an address tag for locating data stored in said data memory section, a comparator for comparing an output of said tag memory section with an address tag of a given address, and a hit generator for generating a hit signal when said comparator determines said output of said tag memory section coincides with said given address, said microprocessor further including means for controlling said first cache memory and said second cache memory such that, in response to an access from said central processing unit, said first cache memory is accessed first, and if the hit signal is not generated from said access of said first cache memory, said second cache memory is accessed, and if the hit signal is not generated from one of said access of said first and second cache memories, an external memory is accessed wherein the smaller second cache memory and the larger first cache memory maintains or improves the hit/miss ratio of the overall cache memory system, and exclusive-OR means for receiving a portion of the address when said access of said first cache memory does not generate said hit signal, so as to supply said portion of the address as an address for said tag memory section and said data memory section of said second cache memory.

6. A microprocessor claimed in claim 5, wherein an access time for said first cache memory is substantially the same as an access time for said second cache memory.

7. A microprocessor comprising:

a central processing unit, a first cache memory and a second cache memory all implemented on a single integrated circuit chip, each of said first and second cache memories including a data memory section for storing data, a tag memory section for storing an address tag for locating data stored in said data memory section, a comparator for comparing an output of said tag memory section with an address tag of a given address, and a hit generator for generating a hit signal when said comparator determines said output of said tag memory section coincides with said given address, each of said first and second cache memories comprising direct-mapped cache memories, and said second cache memory having a memory capacity smaller than that of said first cache memory, said microprocessor further including means for controlling said first cache memory and said second cache memory such that, in response to an access from said central processing unit, said first cache memory is accessed first, and if the hit signal is not generated from said access of said first cache memory, said second cache memory is accessed, and if the hit signal is not generated from one of said access of said first and second cache memories an external memory accessed wherein the smaller second cache memory and the larger first cache memory maintains or improves the hit/miss ratio of the overall cache memory system; and exclusive-OR means receiving a portion of the address when said access of said first cache memory does not generate said hit signal, so as to supply said portion of the address as an address for said tag memory section and said data memory section of said second cache memory.

8. A microprocessor claimed in claim 7, wherein an access time for said first cache memory is substantially the same as an access time for said second cache memory.

* * * * *